US012715583B2

(12) United States Patent
Mallonee

(10) Patent No.: US 12,715,583 B2
(45) Date of Patent: Aug. 25, 2026

(54) STOWABLE ENTRY HANDLE

(71) Applicant: Textron Aviation Inc., Wichita, KS (US)

(72) Inventor: Mark Kendall Mallonee, Wichita, KS (US)

(73) Assignee: Textron Innovations Inc., Providence, RI (US)

( * ) Notice: Subject to any disclaimer, the term of this patent is extended or adjusted under 35 U.S.C. 154(b) by 650 days.

(21) Appl. No.: 18/165,745

(22) Filed: Feb. 7, 2023

(65) Prior Publication Data

US 2023/0249826 A1 Aug. 10, 2023

Related U.S. Application Data

(60) Provisional application No. 63/307,806, filed on Feb. 8, 2022.

(51) Int. Cl.
*B64D 9/00* (2006.01)

(52) U.S. Cl.
CPC .................................... *B64D 9/00* (2013.01)

(58) Field of Classification Search
CPC ....................................................... B64D 9/00
USPC ........................................................ 186/106
See application file for complete search history.

(56) References Cited

U.S. PATENT DOCUMENTS

| | | | | |
|---|---|---|---|---|
| 4,125,235 | A | 11/1978 | Fitzgerald et al. | |
| 7,677,494 | B2 | 3/2010 | Yada et al. | |
| 9,469,389 | B2 | 10/2016 | Heinen | |
| 9,889,782 | B2 * | 2/2018 | Gobart | B60N 3/02 |
| 10,689,089 | B2 | 6/2020 | Terry et al. | |

* cited by examiner

*Primary Examiner* — Daniel J Troy
(74) *Attorney, Agent, or Firm* — Avek IP, LLC

(57) ABSTRACT

A stowable entry handle includes a handle having a first end and a second end opposite the first end, a shaft mechanically coupled with the handle, a protrusion extending from an end of the shaft opposite the handle, and a mounting structure for mechanically coupling to a side wall adjacent a doorway. The shaft includes a cylindrical member that extends perpendicularly from the first end. The mounting structure includes a tube configured to receive the shaft. The tube includes a first slot at a first position within the tube and a second slot at a second position within the tube. The protrusion is configured to insert into the first slot for stowing the handle inside the doorway and the second slot for deploying the handle outside the doorway.

16 Claims, 12 Drawing Sheets

STOWABLE ENTRY HANDLE

CROSS-REFERENCE TO RELATED APPLICATIONS

This application claims the benefit of priority of U.S. Provisional Patent Application No. 63/307,806, entitled Stowable Entry Handle and filed on Feb. 8, 2022, the disclosure of which is herein incorporated by reference in its entirety.

BACKGROUND

1. Field

Embodiments of the invention relate generally to aircraft entryways, and more specifically to airstair entry handles.

2. Related Art

Entry handles to aircraft are found in the prior art. For example, U.S. Pat. No. 10,689,089 to Terry et al. discloses an entry handle system. U.S. Pat. No. 7,677,494 to Yada et al. discloses a deployable stairway having a handrail. U.S. Pat. No. 9,469,389 to Heinen discloses an aircraft boarding handrail. U.S. Pat. No. 4,125,235 to Fitzgerald et al. discloses a handle within a fuselage.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

In an embodiment, a stowable entry handle includes: a handle having a first end and a second end opposite the first end; a shaft mechanically coupled with the handle, wherein the shaft includes a cylindrical member that extends perpendicularly from the first end; a mounting structure, wherein the mounting structure is configured for mechanically coupling to a side wall adjacent a doorway, the mounting structure including: a tube configured to receive the shaft, wherein the tube includes a first slot at a first position within the tube and a second slot at a second position within the tube; and a protrusion extending from an end of the shaft opposite the handle, wherein the protrusion is configured to insert into 1) the first slot for stowing the handle inside the doorway and 2) the second slot for deploying the handle outside the doorway.

In another embodiment, a method for deploying and stowing an entry handle includes: deploying the entry handle from a stowed position inside a doorway, wherein deploying the entry handle includes: rotating the entry handle upwardly to an intermediate position; sliding the entry handle towards the doorway; and rotating the entry handle downwardly from the intermediate position to a deployed position, wherein the entry handle extends outside the doorway in the deployed position; and stowing the entry handle from the deployed position, wherein stowing the entry handle includes: counterrotating the entry handle upwardly from the deployed position to the intermediate position; sliding the entry handle away from the doorway; and counterrotating the entry handle downwardly to the stowed position.

BRIEF DESCRIPTION OF THE DRAWING FIGURES

Embodiments of the invention are described in detail below with reference to the attached drawing figures, wherein.

Figure 1:
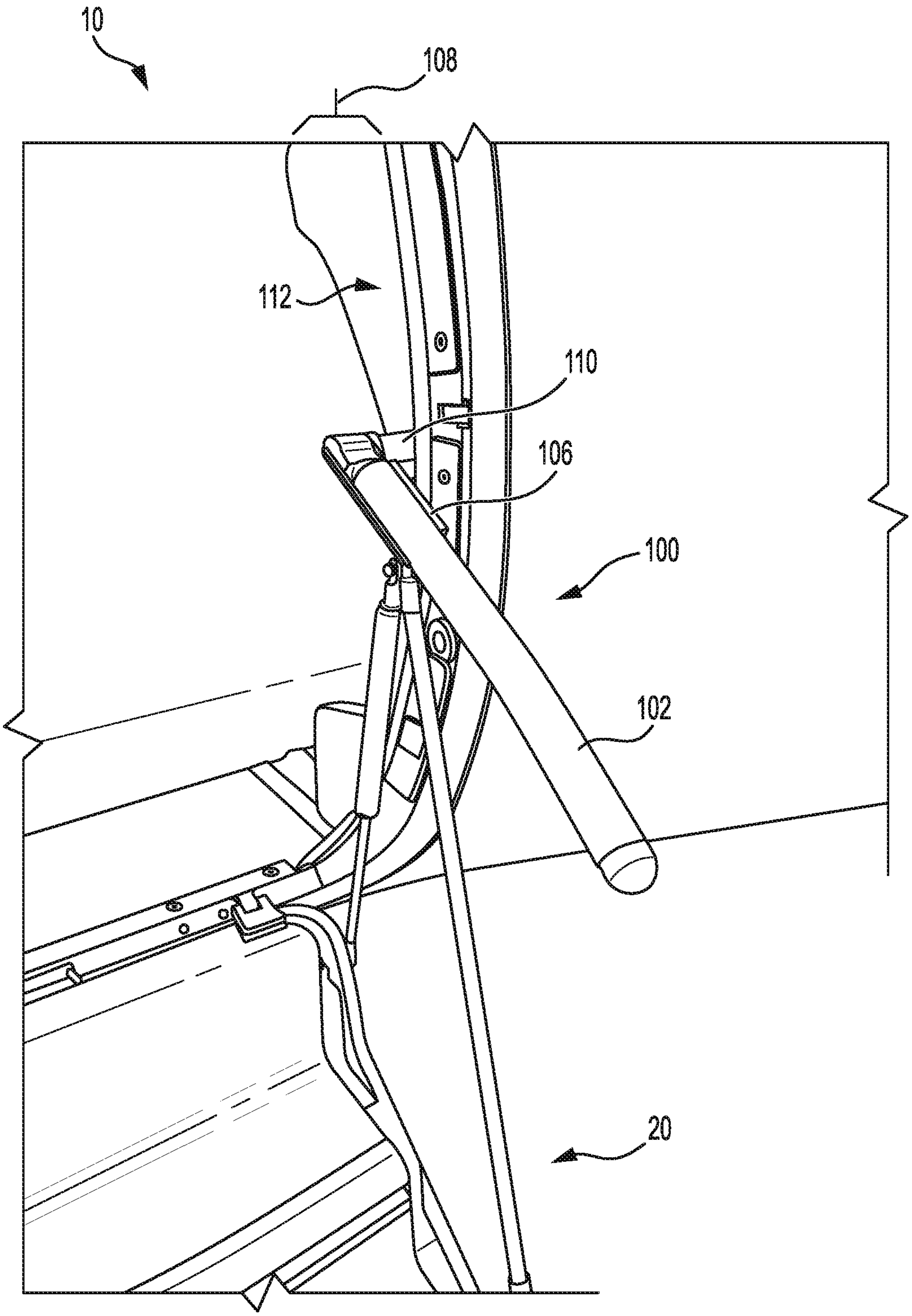
FIG. 1 shows a stowable entry handle, of some embodiments.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of the equivalents to which such claims are entitled.

In this description, references to “one embodiment,” “an embodiment,” or “embodiments” mean that the feature or features being referred to are included in at least one embodiment of the technology. Separate references to “one embodiment,” “an embodiment,” or “embodiments” in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Aircraft entryways often times comprise one or more steps for entering or exiting the aircraft. In some circumstances, a passenger embarking or disembarking the aircraft may require some assistance, such as a handle or railway, to enter or exit via the stairway. Due to aerodynamic requirements of the aircraft, a handle or railway is typically stowable such that it may be either removed from the entryway (i.e., taken out via the exterior of the aircraft) or stowed within an interior portion of the aircraft. Stowing of the entryway handle on the interior of the aircraft is beneficial to passengers within the aircraft as they may deploy the handle by themselves for providing assistance while exiting the aircraft. Similarly, stowing the handle within the fuselage such that the handle does not take up a substantial amount of space is advantageous as the fuselage must meet a required minimum amount of space to allow for proper functioning of the aircraft. Furthermore, in some cases it is advantageous for the handle and the stairway to be independent of one another, such that the handle does not have to be deployed with the stairway. Such uncoupling of the handle from the stairway is advantageous for passengers who may not require the handle for assistance in entering or exiting the aircraft, making the process more efficient.

Turning to FIG. 1, a stowable entry handle 100 of some embodiments is illustrated. Stowable entry handle 100 may be disposed in an entryway 10. In some embodiments, entryway 10 may be located on an aircraft, such as an airplane. Entryway 10 may comprise a stairway 20. In some embodiments, the stairway 20 may be deployed internally from the aircraft. In other embodiments, the stairway 20 may be located externally to the aircraft. In these embodiments, the stairway may be completely separate from the aircraft or disposed on an external portion of the aircraft (e.g., a stairway on a floatplane).

Stowable entry handle 100 comprises a handle 102 mechanically coupled to a shaft 110 via a bracket 106. The handle 102 may be an appropriate length to both substantially stow within the fuselage of the aircraft as well as assist passengers along a substantial portion of the stairway 20. For example, the handle 102 may be longer for a stairway 20 comprising eight steps than a handle 102 for a stairway 20 comprising two steps. In some embodiments, a longitudinal axis of handle 102 is canted relative to the aircraft fuselage, which allows the end of handle 102 to stow further aft inside the aircraft while clearing the entryway threshold and still deploying to the desired position. In certain embodiments, stowable entry handle 100 is configured for stowing close to the fuselage to avoid interfering with a seat 108 when reclined.

In embodiments, the shaft 110 mechanically couples the handle 102 to a side wall 112 adjacent a doorway. Shaft 110 extends from a first end of handle 102. In embodiments, shaft 110 extends nearly perpendicular to handle 102 but is canted a few degrees off of perpendicular. The side wall 112 may comprise a portion of the entryway 10 to an aircraft, as depicted in FIG. 1. It is contemplated that the entryway 10 may be located on any portion of the aircraft. It is further contemplated that the side wall 112 may comprise a portion of the fuselage of an aircraft.

In embodiments, shaft 110 comprises a cylindrical shape configured to spin about its longitudinal axis (e.g., along the A-A' line depicted in FIG. 2A and FIG. 2B), such that handle 102 rotates about the first end (i.e., the end of handle 102 mechanically coupled to shaft 110 via bracket 106). A second end of handle 102, opposite the first end, provides a free exposed end for a user to grasp by hand. Rotation about the longitudinal axis depicted as A-A' in FIGS. 2A and 2B enable handle 102 to be rotated between a stowed position and a deployed position.

In some embodiments, shaft 110 is both rotatable and translatable. For example, as will be discussed in greater detail below, the handle 102 may rotate around a longitudinal axis of shaft 110 (e.g., axis A-A' depicted in FIG. 2A and FIG. 2B) while also being able to translate away from or towards side wall 112. In embodiments, both rotation and translation of the stowable entry handle 100 is used to transition from a stowed configuration to a deployed configuration, and vice versa.

In some embodiments, the rotation of the stowable entry handle 100 may be biased in a certain direction. For example, shaft 110 may comprise one or more rotational springs that bias the handle 102 in a certain rotational direction. In some embodiments, the one or more rotational springs may bias stowable entry handle 100 in the deployed direction (e.g., clockwise rotation of shaft 110 about axis A-A' of FIGS. 2A and 2B). Alternatively, the one or more rotational springs may bias the handle 102 in the stowed direction (e.g., counterclockwise rotation of shaft 110 about axis A-A'). In these embodiments, a user may overcome the force of the one or more rotational springs to place the stowable entry handle 100 in either the stowed or deployed configuration. One or more rotational springs may be used to counter-balance the weight of handle 102 while rotating, in some embodiments.

In operation, a user may actuate the handle 102 around the longitudinal axis (A-A') of shaft 110 to move the stowable entry handle 100 from the stowed position to the deployed position. In some embodiments, a user may release the stowable entry handle 100 from the stowed position, wherein the stowable entry handle 100 may, following release, automatically deploy. For example, there may be a button operatively connected to the stowable entry handle 100, maintaining the stowable entry handle 100 in the stowed configuration. Upon actuation of the button, or other locking mechanism, mechanisms biasing the stowable entry handle 100 towards the deployed configuration (e.g., linear and/or rotational springs) may cause deployment of the handle 102 automatically.

Figure 2A:
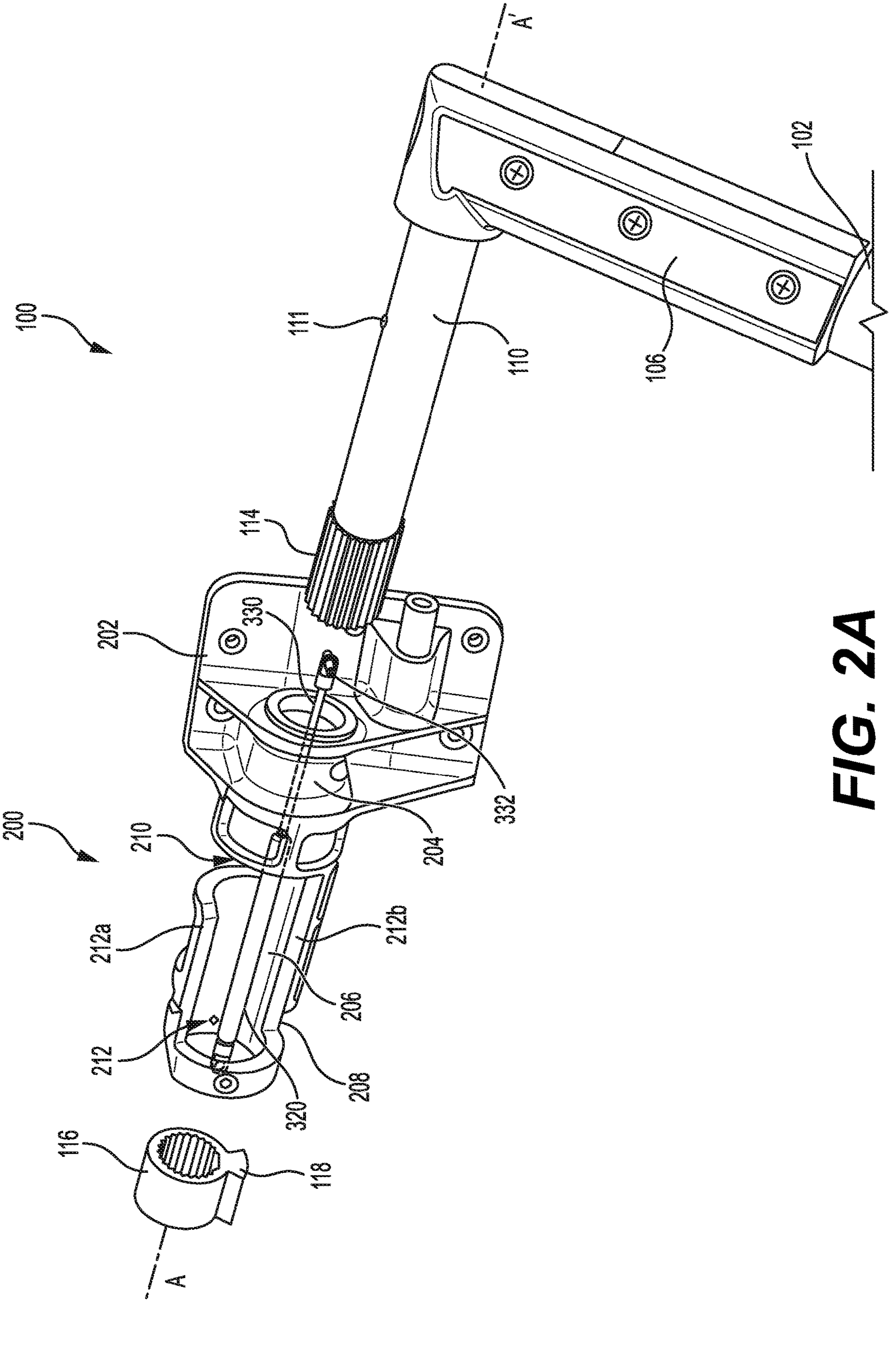
FIGS. 2A-2B show certain aspects of a pivoting apparatus of the stowable entry handle of FIG. 1, in some embodiments.
Figure 2B:
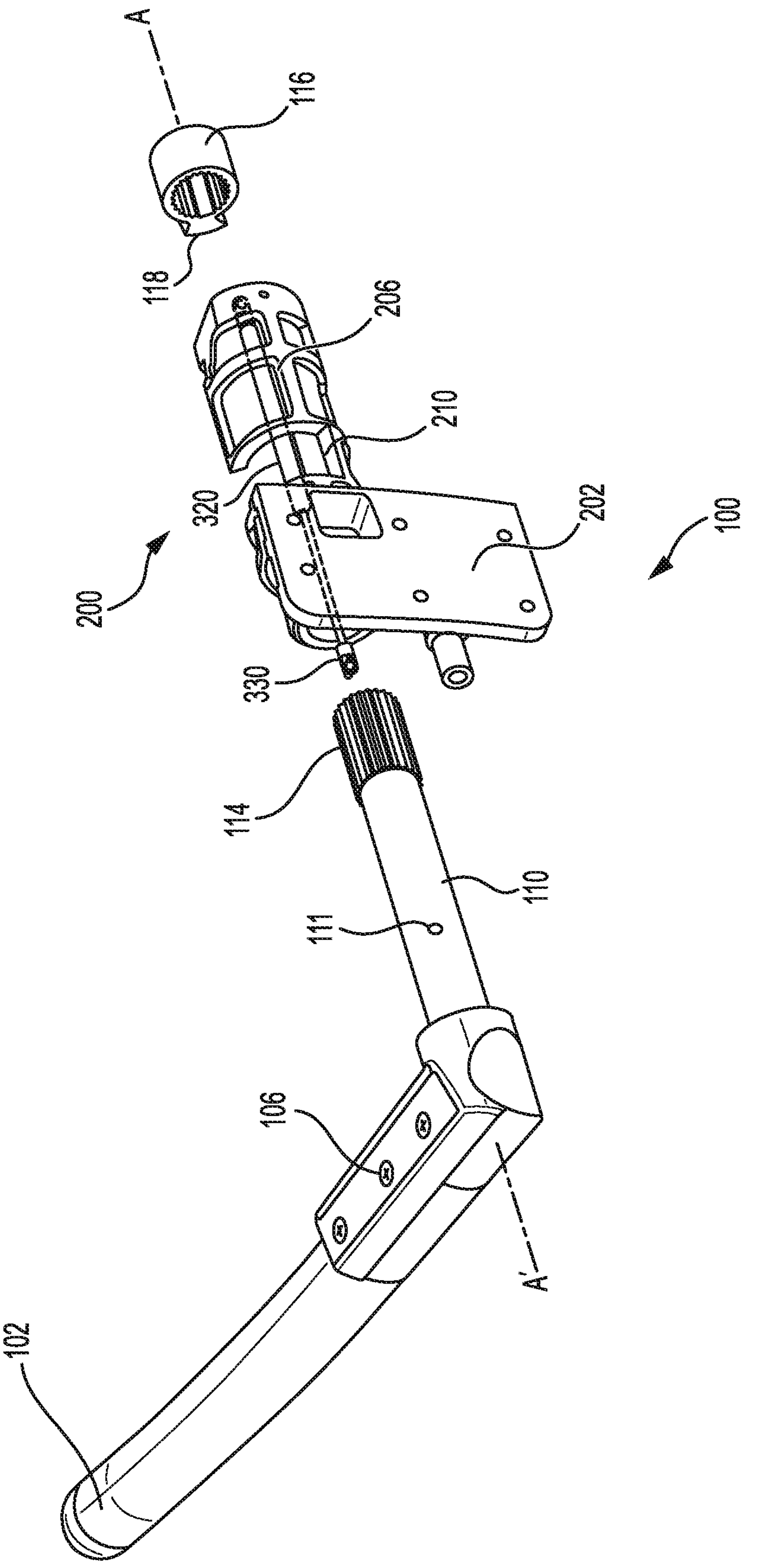

Turning now to FIGS. 2A and 2B, the inner portions of the stowable entry handle 100 are illustrated with an exploded view of parts from a perspective within the aircraft or vehicle (i.e., FIG. 2A) and from outside the aircraft or vehicle (i.e., FIG. 2B). The stowable entry handle 100 may comprise a plurality of hard (e.g., physical) stops, as well as bushings, that allow for multiple rotation planes of the stowable entry handle 100, which will be discussed in greater detail below with reference to FIGS. 3A-5C. In some embodiments, stowable entry handle 100 comprises a mounting structure 200 housed partially or fully within side wall 112 and mechanically coupled thereto via a mounting plate 202. Mounting structure 200 is configured to provide a stable connection between the handle 102 and the aircraft or vehicle.

In embodiments, mounting structure 200 includes a port 204 and a tube 206 which are configured to receive shaft 110. As will be discussed, port 204 and tube 206 may allow for shaft 110 to slide and rotate therewithin. Furthermore, tube 206 may comprise a first stop 208 and second stop 210. As discussed in greater detail below with reference to FIGS. 3A-3C, first and second stops 208, 210 provide specific stopping points for the rotation of stowable entry handle 100. In embodiments, first and second stops 208, 210 each comprise a slot formed in the wall of tube 206. Additional pathways and additional stops may be employed, with the additional stops being in various alternate positions, for adjusting a deployed position and/or for providing more than one deployed position, without departing from the scope hereof.

In embodiments, a cap 116 is mechanically coupled to an end 114 of shaft 110. Cap 116 comprises a protrusion 118, which is a protruding member that extends outside of cap 116 and is configured to insert into the first and second stops 208, 210. In embodiments, shaft 110 comprises exterior splines along its exposed end and cap 116 comprises interior splines configured to interface the exterior splines of shaft 110. The splines help prevent sliding of cap 116 about shaft 110. Alternatively, other techniques known to one of skill in the art such as keyways may be used in place of splines without departing from the scope hereof. Once cap 116 is installed on shaft 110 within tube 206, cap limits translation of shaft 110 to within tube 206. In other words, cap 116 prevents removal of shaft 110 from port 204.

A position of cap 116 and protrusion 118 relative to bracket 106 is important for proper operation of handle 102. Bracket 106 provides the proper location and angle for handle 102 to be useful based on protrusion 118 reaching first and second stops 208, 210 and upper and lower limits 212*a*, 212*b*. The rotational position of cap 116 about protrusion 118 and the position along the length of the shaft 110 are both configured to ensure proper operation of handle 102. Cap 116 and shaft 110 each have a corresponding missing spline tooth that assures proper orientation of cap 116 on shaft 110. Shaft 110 includes two circular grooves configured to each receive a snap ring (not shown), which provides the proper location of cap 116 along the length of the shaft 110. A set screw in cap 116 is configured to remove any back-lash or rattle. However, the snap rings provide the primary means of retaining the cap 116 on shaft 110 in the proper location. However, other means such as pins may be used in place of snap rings without departing from the scope hereof.

Figure 5A:
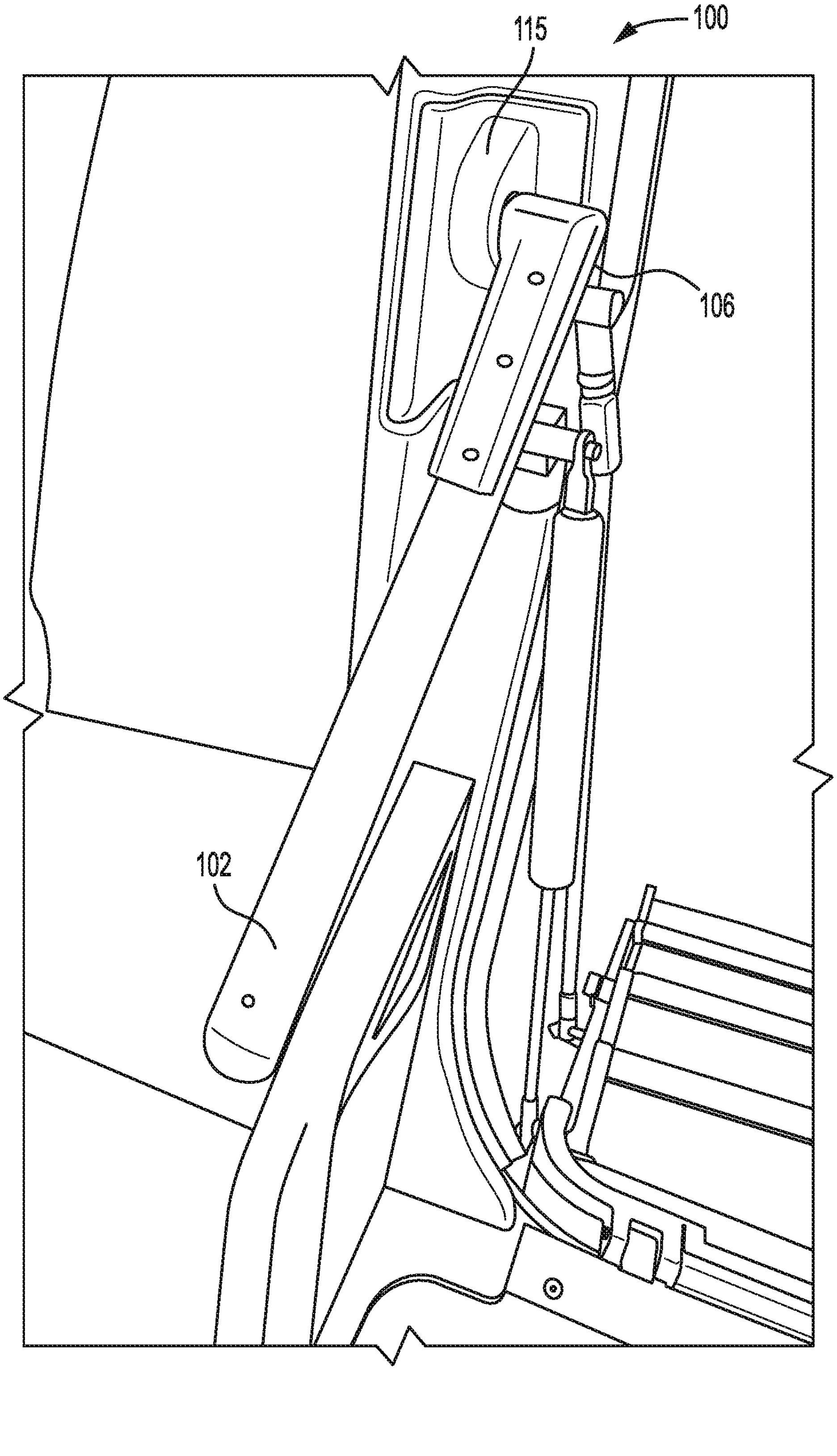
FIGS. 5A-5C show, from the inside of the aircraft, the stowable entry handle of FIG. 1 in transition between the stowed position and the deployed position, in some embodiments.
Figure 5B:
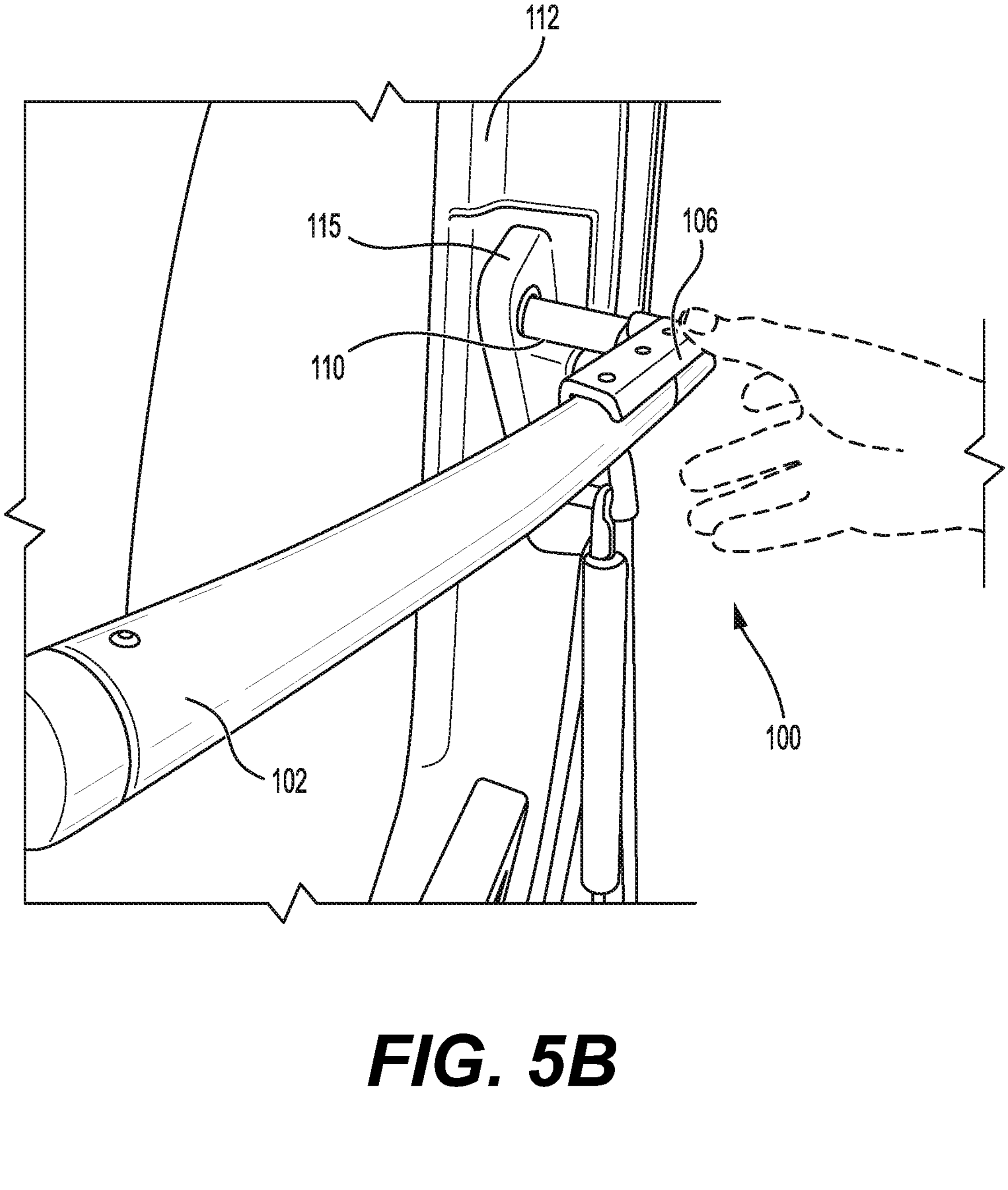
Figure 5C:
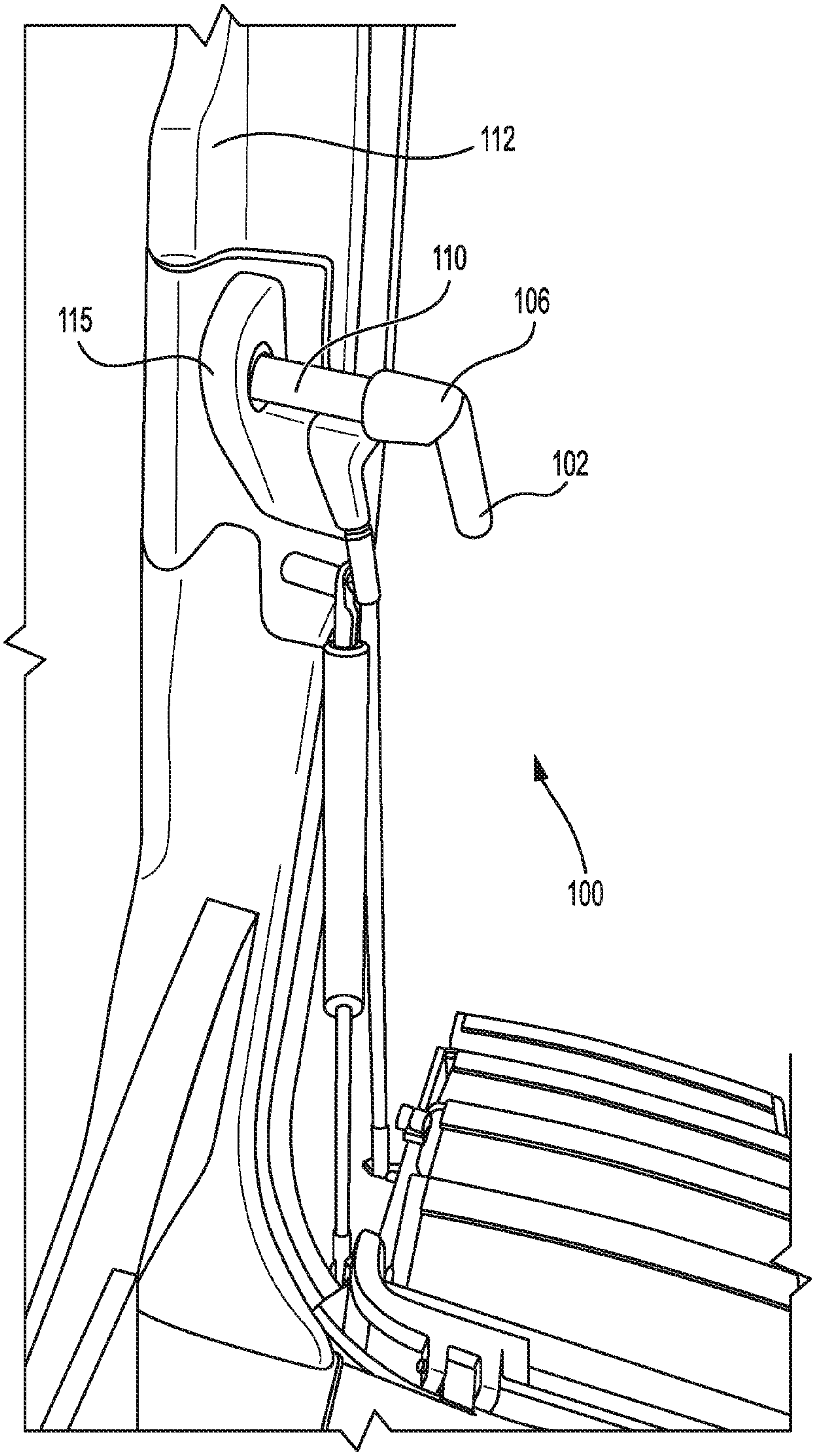

Furthermore, protrusion 118 may be configured to slide along a pathway 212 disposed longitudinally along tube 206. Pathway 212 may comprise an upper limit 212*a* and lower limit 212*b*. The upper limit 212*a* and lower limit 212*b* are configured to allow translation of the protrusion 118 (and hence the attached handle 102) in a substantially longitudinal direction (i.e., along the A-A' axis). In some embodiments, the upper limit 212*a* and lower limit 212*b* may prevent vertical movement of the protrusion 118 therein. Accordingly, while protrusion 118 is located within the pathway 212, tube 206 is configured to prevent rotation of shaft 110. Such a configuration may prevent the handle 102 from rotating into certain components located within the vehicle or fuselage in which stowable entry handle 100 is disposed. Inner workings of stowable entry handle 100, including mounting structure 200 may be concealed behind a cover 115, as depicted in FIGS. 5A, 5B, and 5C. Cover 115 may comprise any type of façade or covering for some or all of mounting structure 200 and related components.

A biasing mechanism may be employed in embodiments to provide a linear bias for assisting with translation of shaft 110. In embodiments, the biasing mechanism is aligned with the longitudinal axis of shaft 110 (i.e., axis A-A' of FIGS. 2A and 2B). In some embodiments, the biasing mechanism is compressed in the stowed position, and thus biasing of shaft 110 occurs in an outwards direction (i.e., into the entryway 10). The biasing mechanism may be one of a spring, a gas spring, a gas strut, a spring strut, a hydraulic cylinder, etc. For example, the biasing mechanism may be disposed on one end of cap 116, thereby biasing cap 116 and subsequently shaft 110 towards entryway 10. In other embodiments, a user may actuate stowable entry handle 100 outwards (i.e., towards entryway 10) by hand. In yet other embodiments, the biasing mechanism may be compressed in the deployed position, and thus bias the shaft 110 inwards (i.e., into side wall 112). In the embodiment depicted in FIGS. 2A and 2B, the biasing mechanism is a gas spring having a cylinder 320 and a rod 330. The gas spring is configured to operate as a compression spring and is operatively coupled with shaft 110 and tube 206, with both ends of the gas spring being retained by a clevis. Cylinder 320 may be fastened to the end of tube 206 (e.g., using a screw, not shown), while rod 330 may be fastened to shaft 110 using a spring pin 332 (see FIG. 2A) through a hole 111 in shaft 110 (see FIGS. 2A and 2B).

Figure 3A:
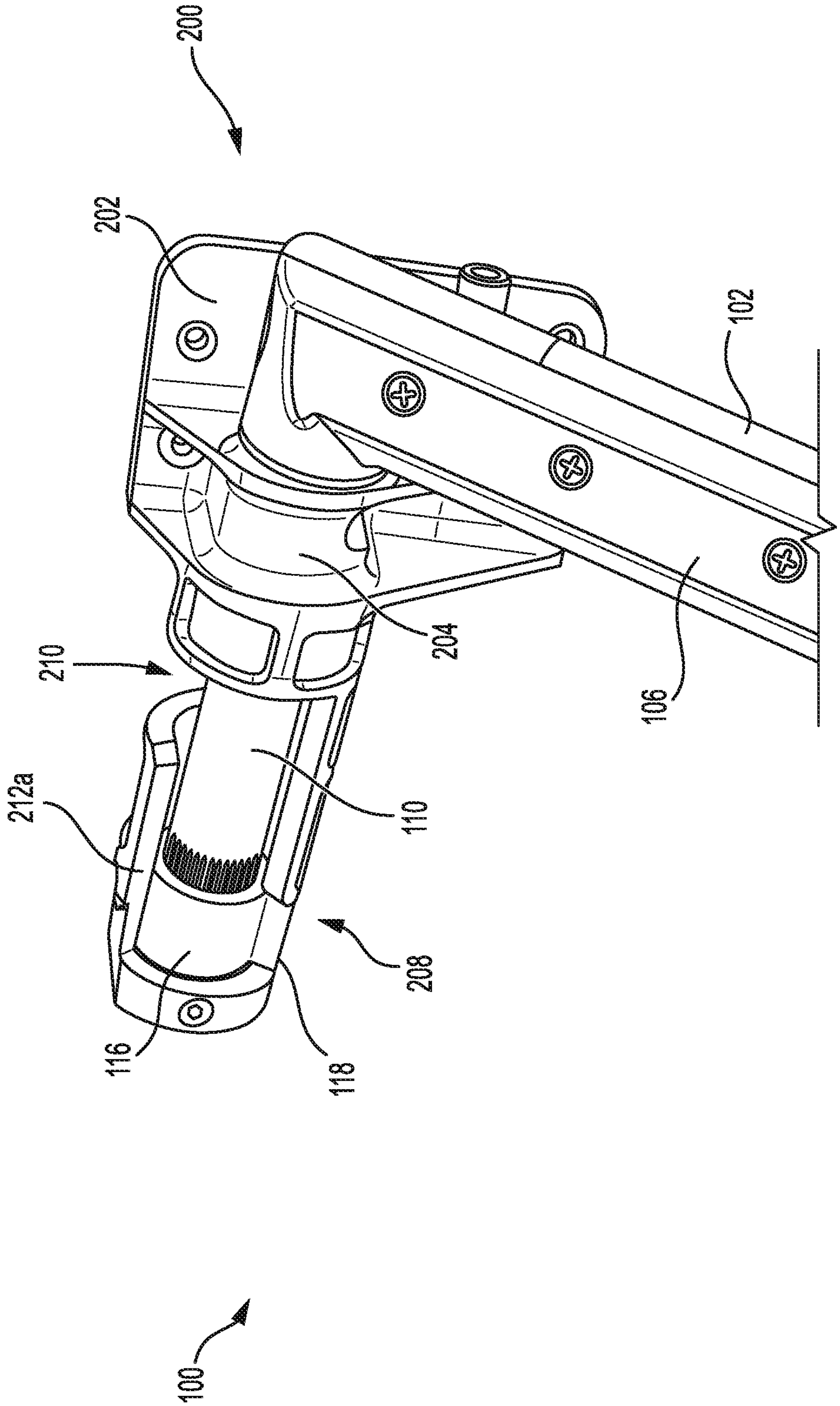
FIGS. 3A-3C show, from the inside of the aircraft, some inner portions of the entry handle of FIG. 1 in transition between a stowed position and a deployed position, in some embodiments.

With reference now to FIGS. 3A through 5C, stowable entry handle 100 is shown as assembled for illustrating the steps to deploy/stow stowable entry handle 100. It is noted that FIGS. 3A, 4A, and 5A depict stowable entry handle 100 in a stowed position; FIGS. 3B, 4B, and 5B depict stowable entry handle 100 in an intermediate position; FIGS. 3C, 4C, and 5C depict stowable entry handle 100 in a deployed position. From a stowed position (i.e., FIGS. 3A, 4A and 5A), deployment of handle 102 is initiated by upwardly rotating handle 102 to a specific location. As depicted in FIG. 3A, such upwards rotation may occur until protrusion 118 exits the first stop 208, and is substantially located within pathway 212 and abutting upper limit 212*a*. Upon reaching the bounds of pathway 212 (i.e., upper limit 212*a*) further rotation of the stowable entry handle 100 may be prevented. Additionally, in some embodiments, once protrusion 118 exits the first stop 208 and is substantially located within pathway 212, the shaft 110, and thus the handle 102, may translate towards, or into, the entryway 10.

During translation in pathway 212, protrusion 118 is configured to be smaller than the gap between upper and lower limits 212*a*, 212*b*. This allows for rotation of shaft 110 to be rotated through a range of angles during translation of protrusion 118 from first stop 208 to second stop 210, which allows handle 102 to be rotated through a range of angles during translation towards (into) the entryway 10, thereby providing a more fluid and smooth motion.

Upon completion of the translation, the stowable entry handle 100 may further rotate downwards until reaching a second stop (e.g., second stop 210). Once the second stop is reached (e.g., protrusion 118 is received within second stop 210), the stowable entry handle 100 may be in a fully deployed position. The fully deployed position may be substantially aligned with the stairway 20 when the stairway 20 is fully deployed.

Figure 3B:
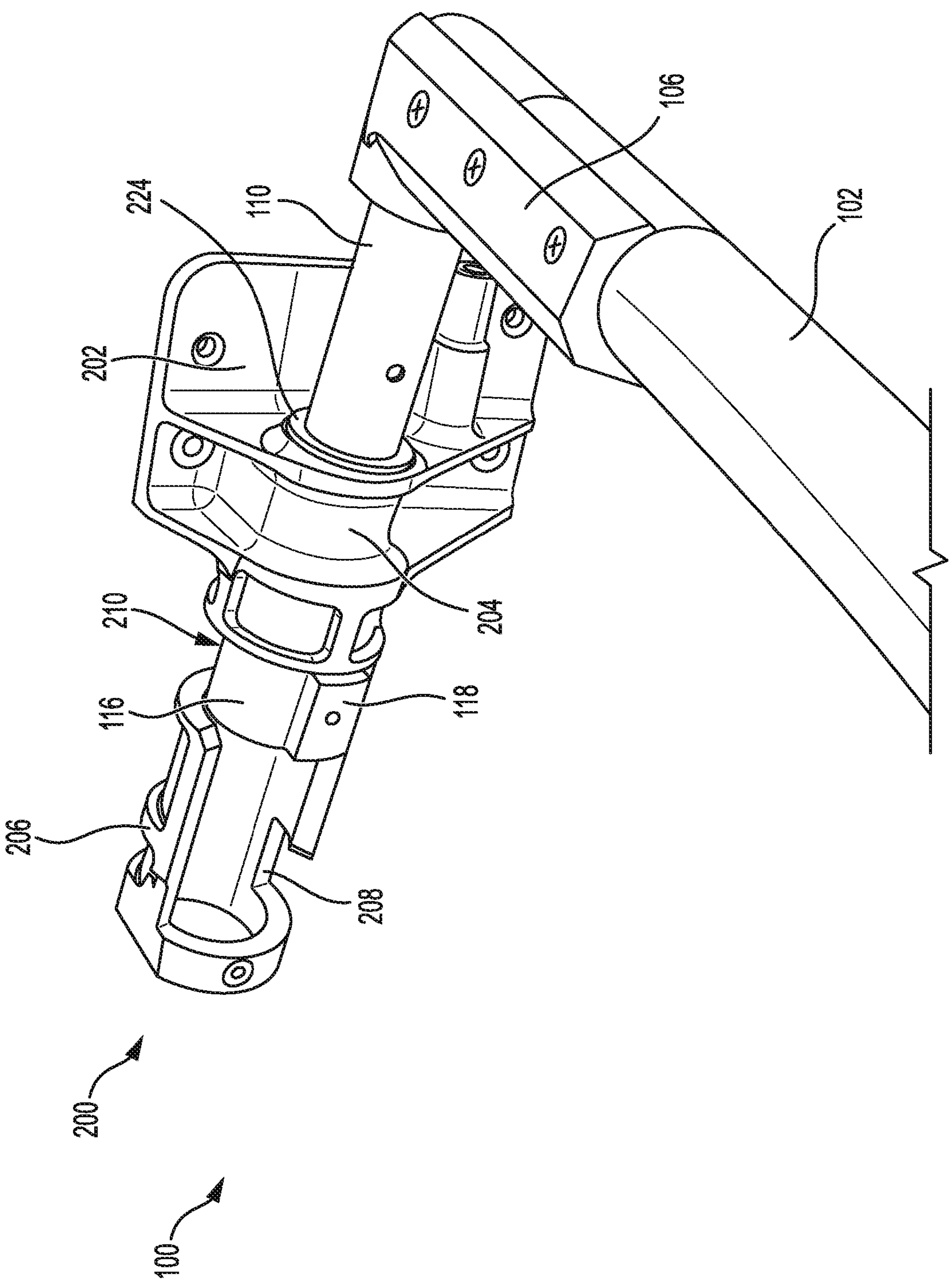
Figure 3C:
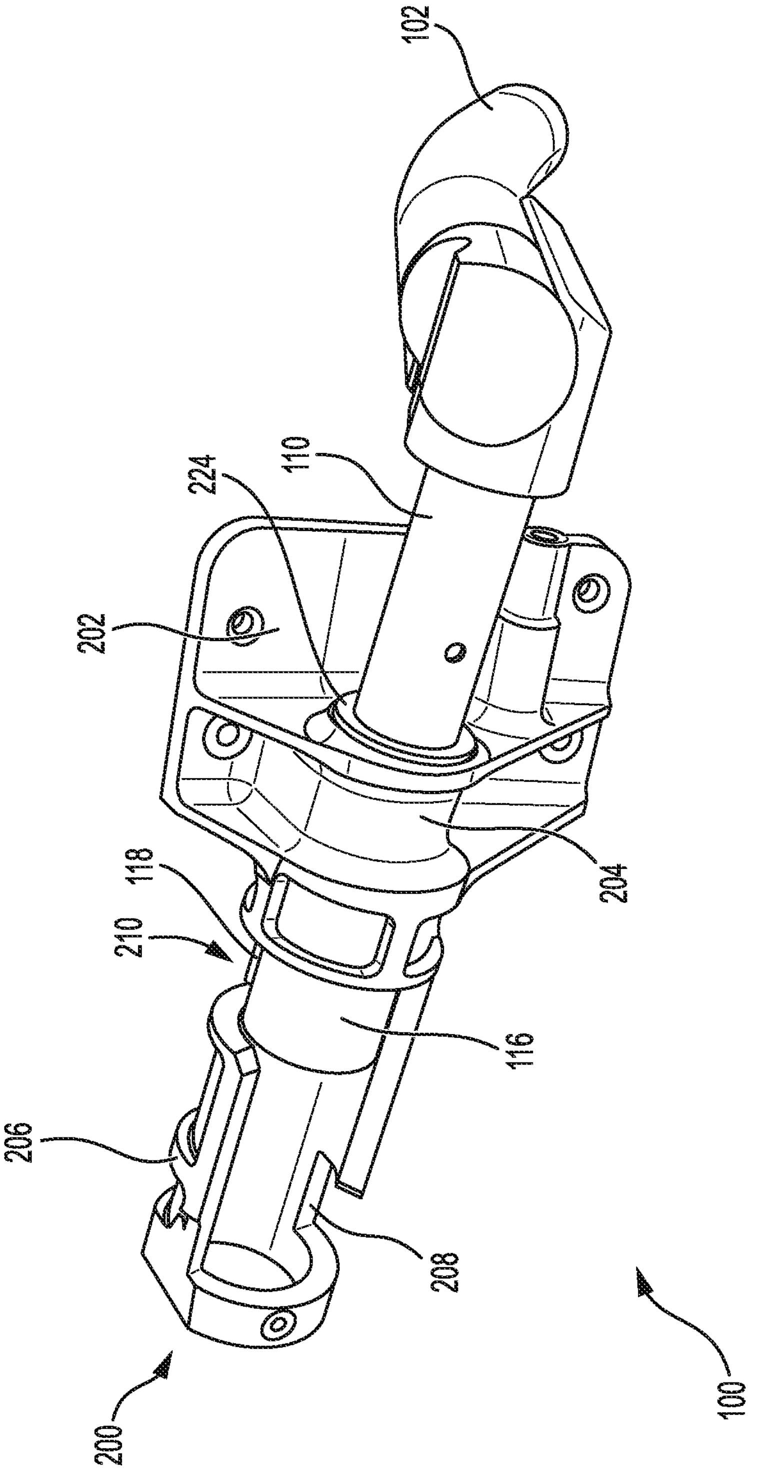
Figure 4A:
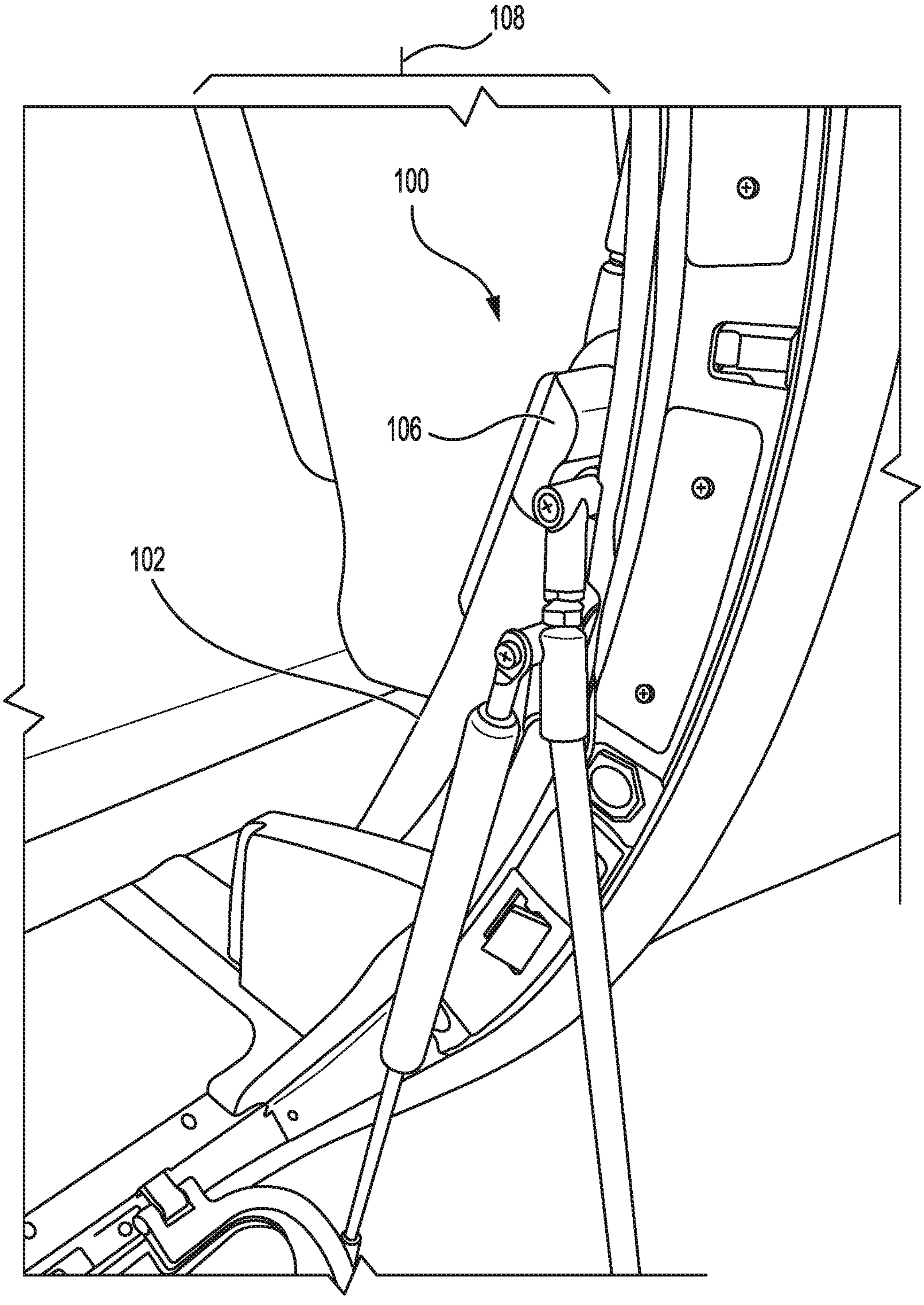
FIGS. 4A-4C show, from the outside of the aircraft, the stowable entry handle of FIG. 1 in transition between the stowed position and the deployed position, in some embodiments.
Figure 4B:
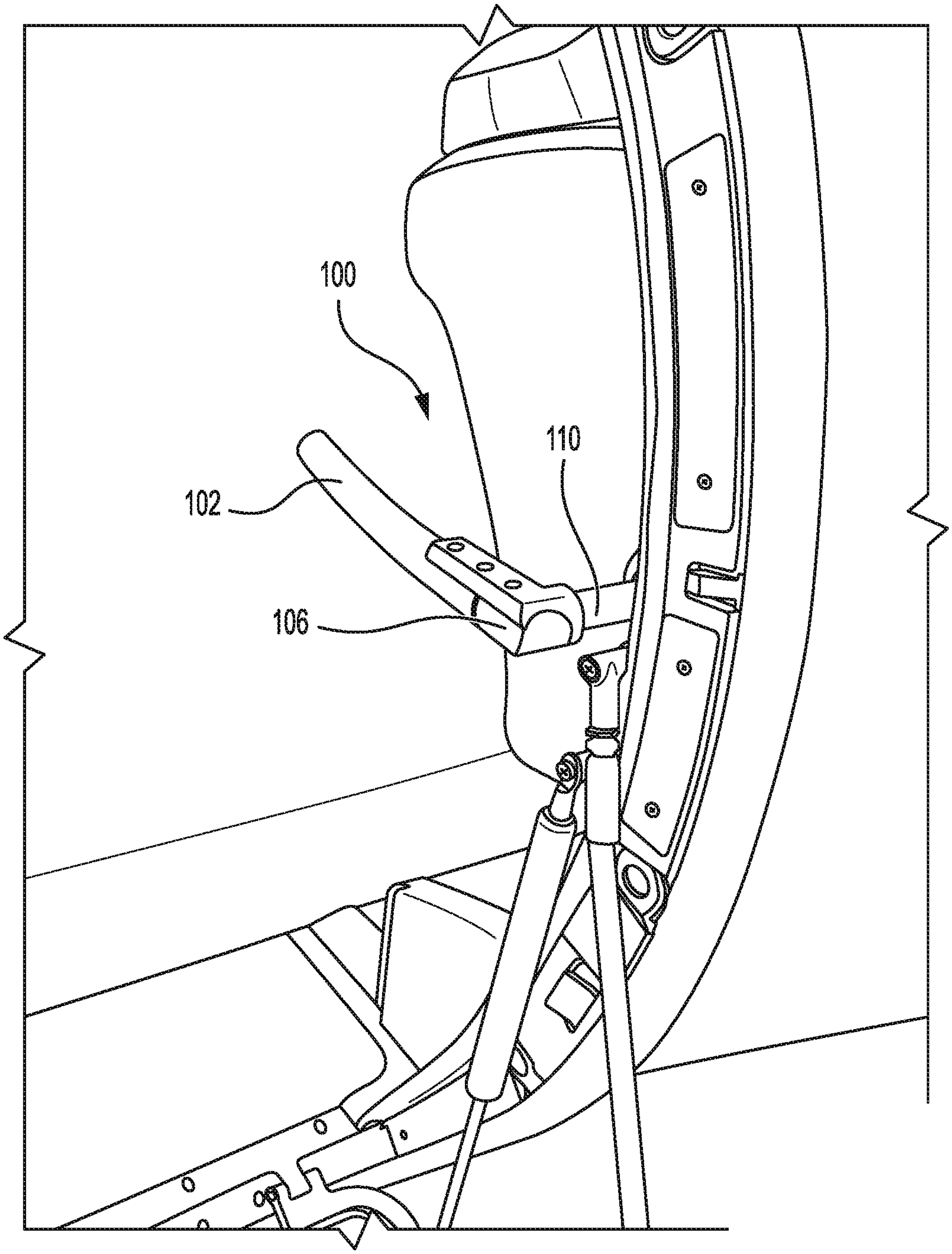
Figure 4C:
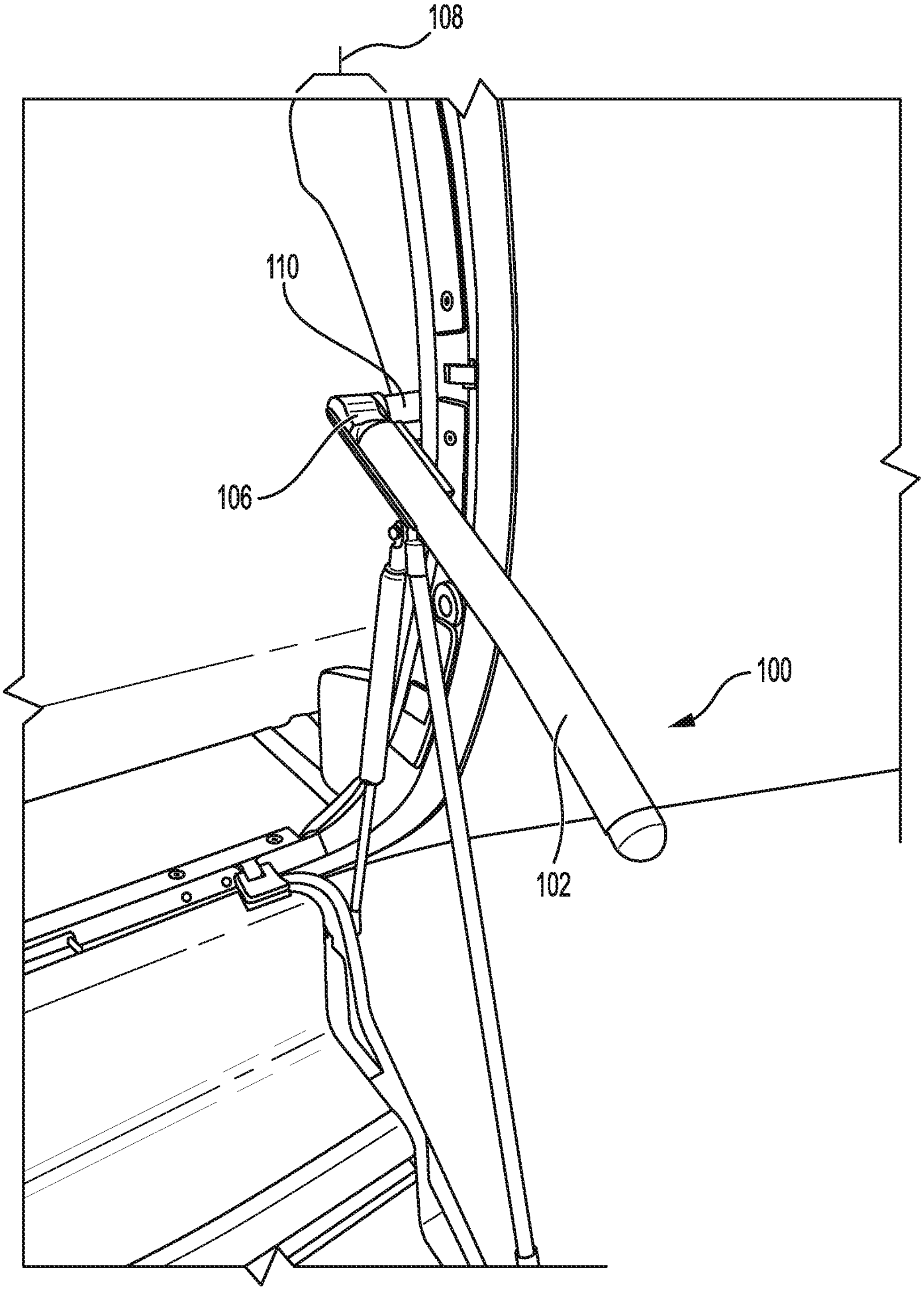

FIGS. 4A-4C show the stowable entry handle 100 from the outside of the aircraft whereas FIGS. 3A-3C and 5A-5C show the stowable entry handle 100 from inside the aircraft. As such, FIGS. 3A-5C are best viewed together with the following description. As illustrated in FIGS. 3A, 4A, and 5A, the stowable entry handle 100 is in the stowed position. In the stowed position, the stowable entry handle 100 is rotated substantially inwardly and downwards, such that the profile of the handle 102 is similar to the profile of the fuselage of the aircraft. Additionally, in the stowed position, the stowable entry handle 100 is translated away from the entryway (i.e., into the side wall 112 and tube 206). Stowable entry handle 100 is maintained in the stowed position by protrusion 118 being received by first stop 208, as illustrated in FIG. 3A. Accordingly, in the stowed position the stowable entry handle 100 is stowed inside the aircraft in such a manner as to use only a minimal amount of space.

FIGS. 3B, 4B, and 5B depict an intermediate position in which the stowable entry handle 100 is in between the deployed and stowed positions. It is noted that in normal operation of the stowable entry handle 100, the intermediate position would be ephemeral as the handle 102 is moved between stowed and deployed positions. In other words, the handle 102 would not normally reside in the intermediate position for any considerable amount of time; instead, the handle 102 briefly passes through the intermediate position during stowing or deploying operations. As such, FIGS. 3B, 4B, and 5B are intended for descriptive purposes only to illustrate operation of stowable entry handle 100.

Following upward rotation of the handle 102 around the longitudinal axis of shaft 110 (i.e., axis A-A' shown in FIGS. 2A and 2B), a first stopping point is reached. As depicted in FIG. 3A, such rotation will terminate when protrusion 118 abuts the upper limit 212*a* of pathway 212. The upper limit 212*a* may prevent further rotation of the stowable entry handle 100 in the upward direction until the stowable entry handle 100 is translated away from the side wall 112 (i.e., into the entryway 10). Translation of the stowable entry handle 100 may be caused by a translating member which is biased in the outward direction. Note that FIGS. 4B and 5B depict the shaft 110 extended away from the side wall 112 and (as best viewed in FIG. 3B) out of tube 206, which enables viewing of a bushing 224 (as best viewed in FIGS. 3B and 3C) installed in port 204. A second bushing may also be installed on the opposite side of port 204 (not shown). Following translation of the stowable entry handle 100 away from the side wall 112, the stowable entry handle 100 may then be capable of further rotation outwards (i.e., outside of the aircraft) towards the deployed position (FIGS. 3C, 4C, and 5C).

FIGS. 3C, 4C, and 5C depict the stowable entry handle 100 in the deployed position. Following translation of the stowable entry handle 100 into the entryway 10, the handle 102 may be further rotated downwardly until it is substantially parallel with the stairway 20 when the stairway 20 is deployed outside the aircraft. In some embodiments, the handle 102 may rotate until reaching a second stopping point (e.g., second stop 210). As illustrated in FIG. 3C, the protrusion 118 may be received by second stop 210. Such reception of the protrusion 118 into the second stop 210 may maintain stowable entry handle 100 in the deployed position until actuated away from the deployed position, as will be described below. In some embodiments, stowable entry handle 100 includes a locking mechanism configured for locking handle 102 in the deployed position. For example, in certain embodiments a catch with a push button may be configured for actuating by a user. Alternatively, additional pathways and stops may be integrated into shaft 110 for locking handle 102 in one or more positions.

The opposite steps may be taken to move the stowable entry handle 100 from the deployed position (FIGS. 3C, 4C, and 5C) to the stowed position (FIGS. 3A, 4A, and 5A). For example, a user may push handle 102 upwardly towards the entryway while counterrotating handle 102 around the longitudinal axis of shaft 110 (i.e., axis A-A' of FIGS. 2A and 2B) until the protrusion 118 fully exits second stop 210 and reaches the lower limit 212*b* of pathway 212, which may be referred to as the intermediate position (e.g., as depicted in FIGS. 3B, 4B, and 5B). Once the protrusion 118 abuts the lower limit 212*b* of pathway 212, a user may translate shaft 110 into the side wall 112 (i.e., towards and into tube 206 via pathway 212). In some embodiments, such a movement may be accomplished by overcoming the force of a biasing member (e.g., biasing mechanism 320) pushing against shaft 110 in the outwards direction. In other embodiments, a biasing member may bias shaft 110 into or towards tube 206. Following translation of the stowable entry handle 100 into side wall 112 (behind cover 115), handle 102 may be further counterrotated inwardly (i.e., into the aircraft) and downwardly until the protrusion 118 is received by the first stop 208, at which point the stowable entry handle 100 is stowed (as depicted in FIGS. 3A, 4A, and 5A). In the stowed position, the stowable entry handle 100 is secured via the protrusion 118 being within the first stop thereby preventing deployment of cap 116 longitudinally outwards along tube 206.

The stowable entry handle 100 allows for ease of deployment and/or stowing of the handle portion. For example, a user may stow or deploy the stowable entry handle 100 with a simple motion of one hand. As mentioned previously, the uncoupling of the stowable entry handle 100 from the stairway 20 allows for the deployment of the stowable entry handle 100 only when necessary for a passenger or passengers embarking or disembarking the aircraft, and for use with both integrated and separable stairways.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. A stowable entry handle, comprising:
- a handle having a first end and a second end opposite the first end;
- a shaft mechanically coupled with the handle, wherein the shaft comprises a cylindrical member that extends perpendicularly from the first end;
- a mounting structure, wherein the mounting structure is configured for mechanically coupling to a side wall adjacent a doorway;
- a tube mechanically coupled to the mounting structure, wherein the tube is configured to receive the shaft, and wherein the tube comprises a first slot at a first position within the tube, a second slot at a second position within the tube, and a pathway connecting the first slot with the second slot; and
- a protrusion extending from an end of the shaft opposite the handle, wherein the protrusion is configured to insert into 1) the first slot for stowing the handle inside the doorway and 2) the second slot for deploying the handle outside the doorway, and 3) the protrusion is configured to slide in a longitudinal direction along the pathway between the first slot and the second slot while moving the handle between a stowed position and a deployed position.

2. The stowable entry handle of claim 1, wherein the shaft is rotatable within the tube such that the handle rotates while being moved back and forth between the stowed position and the deployed position.

3. The stowable entry handle of claim 2, wherein the protrusion rotates out of the first slot via an upwards rotation of the handle for initiating deployment of the handle.

4. The stowable entry handle of claim 3, wherein the tube comprises an upper limit configured to limit rotation of the protrusion during deployment of the handle.

5. The stowable entry handle of claim 3, comprising a biasing member configured to push the shaft partially out of the tube once the protrusion has been rotated out of the first slot thereby moving the protrusion towards the second slot while moving the handle towards the doorway.

6. The stowable entry handle of claim 5, wherein the biasing member comprises a gas spring aligned longitudinally through an inner portion of the shaft for biasing the shaft towards the doorway.

7. The stowable entry handle of claim 5, wherein upon movement of the protrusion to align with the second slot, the second slot is configured to receive the protrusion thereby enabling rotation of the handle to the deployed position.

8. The stowable entry handle of claim 7, wherein the second slot is configured to stop rotation of the shaft via the protrusion thereby stopping rotation of the handle in the deployed position.

9. The stowable entry handle of claim 1, wherein the handle, while in the deployed position, is configured to extends outside of the doorway above a deployed stairway for assisting a user entering or exiting the doorway.

10. The stowable entry handle of claim 9, wherein the handle, while in the deployed position, is configured to substantially align with a deployed stairway.

11. A stowable entry handle, comprising:

a handle having a first end and a second end opposite the first end;

a shaft mechanically coupled with the handle, wherein the shaft comprises a cylindrical member that extends perpendicularly from the first end;

a mounting structure, wherein the mounting structure is configured for mechanically coupling to a side wall adjacent a doorway;

a tube mechanically coupled to the mounting structure, wherein the tube is configured to receive the shaft, wherein the shaft is rotatable within the tube such that the handle rotates while being moved back and forth between a stowed position and a deployed position, and wherein the tube comprises a first slot at a first position within the tube, a second slot at a second position within the tube, and a pathway connecting the first slot with the second slot; and a protrusion extending from an end of the shaft opposite the handle, wherein the protrusion is configured to insert into 1) the first slot for stowing the handle inside the doorway and 2) the second slot for deploying the handle outside the doorway, and 3) the protrusion is configured to slide in a longitudinal direction along the pathway between the first slot and the second slot while moving the handle between the stowed position and the deployed position, wherein the protrusion extends from the shaft via a cap, the cap being retained in a proper location and orientation along the shaft to provide the stowed and deployed positions of the handle.

12. A method for deploying and stowing an entry handle, wherein the entry handle comprises a handle having a shaft and a tube configured to receive the shaft, wherein the tube comprises a first slot at a first position within the tube, and a second slot at a second position within the tube, and a longitudinal pathway connecting the first slot to the second slot, and the shaft comprises a protrusion extending from an end of the shaft opposite the handle, wherein the protrusion is configured to slide along the longitudinal pathway between the first slot for stowing the handle and the second slot for deploying the handle, the method comprising:

deploying the entry handle from a stowed position inside a doorway, wherein deploying the entry handle comprises:

rotating the handle upwardly to an intermediate position such that the protrusion rotates out of the first slot into the longitudinal pathway;

sliding the handle towards the doorway such that the protrusion slides along the longitudinal pathway to the second position; and rotating the handle downwardly from the intermediate position to a deployed position such that the protrusion rotates into the second slot, wherein the handle extends outside the doorway in the deployed position; and stowing the entry handle from the deployed position, wherein stowing the entry handle comprises:

counterrotating the handle upwardly from the deployed position to the intermediate position such that the protrusion rotates out of the second slot;

sliding the handle away from the doorway such that the protrusion slides along the longitudinal pathway to the first position; and counterrotating the handle downwardly to the stowed position such that the protrusion rotates into the first slot.

13. The method of claim 12, wherein rotating the handle upwardly comprises rotating a first end of the handle via a shaft that extends perpendicularly from the first end, the shaft being slidably and rotatably coupled within the tube housed within an inner side wall adjacent the doorway.

14. The method of claim 13, wherein sliding the handle towards the doorway comprises moving the handle by hand such that the shaft partially slides out of the tube.

15. The method of claim 13, wherein sliding the handle towards the doorway comprises automatically moving the handle via a biasing mechanism operatively coupled to the shaft, wherein the biasing mechanism is configured to partially slide the shaft out of the tube.

16. The method of claim 15, wherein sliding the entry handle towards the inner side wall comprises pushing the entry handle by hand thereby overcoming the biasing mechanism and moving the shaft into the tube.

* * * * *